United States Patent [19]
Brüls et al.

[11] Patent Number: 5,892,883
[45] Date of Patent: Apr. 6, 1999

[54] RECORDING OF A DATA REDUCED DIGITAL VIDEO SIGNAL IN SLANT TRACKS ON A RECORD CARRIER

[75] Inventors: Wilhelmus H.A. Brüls; Marco P. Ceccarelli, both of Eindhoven, Netherlands

[73] Assignee: U.S. Philips Corporation, New York, N.Y.

[21] Appl. No.: 785,460

[22] Filed: Jan. 17, 1997

[30] Foreign Application Priority Data

Jan. 19, 1996 [EP] European Pat. Off. .............. 96200132

[51] Int. Cl.$^6$ ...................................................... H04N 5/91
[52] U.S. Cl. .............................. 386/81; 386/111; 386/109
[58] Field of Search ................................. 386/6–8, 33, 68, 386/81, 109, 111–112; 360/13; H04N 5/92, 5/91, 5/783

[56] References Cited

U.S. PATENT DOCUMENTS

| | | | |
|---|---|---|---|
| 4,807,053 | 2/1989 | Heijnemans | 358/335 |
| 5,142,421 | 8/1992 | Kahlman et al. | 360/40 |
| 5,434,677 | 7/1995 | Oikawa | 358/335 |
| 5,477,397 | 12/1995 | Naimpally et al. | 360/10.3 |
| 5,546,244 | 8/1996 | Park et al. | 360/53 |
| 5,550,643 | 8/1996 | Azadegan | 358/335 |
| 5,647,048 | 7/1997 | Ting et al. | 386/68 |
| 5,717,816 | 2/1998 | Boyce et al. | 386/111 |

FOREIGN PATENT DOCUMENTS

| | | |
|---|---|---|
| 0600690A2 | 6/1994 | European Pat. Off. . |
| 0 632 653 A2 | 1/1995 | European Pat. Off. ......... H04N 5/92 |
| 9527978 | 10/1995 | WIPO . |
| 9528061 | 10/1995 | WIPO . |

*Primary Examiner*—Wendy Garber
*Assistant Examiner*—Vincent F. Boccio
*Attorney, Agent, or Firm*—Edward W. Goodman

[57] ABSTRACT

The invention aims at recording a data reduced digital video signal on a longitudinal record carrier (40) by a recording apparatus of the helical scan type. The apparatus is adapted to generate signal blocks of information of the trick play video signal and to generate signal blocks of information of the data reduced digital video signal. A signal block of information of the data reduced digital video signal comprising a first frame (I-frame) and at least one second frame (B- or P frame) of the data reduced digital video signal. The apparatus is adapted to record each time after each other a signal block of information of the digital trick play video signal and a signal block of information of the data reduced digital video signal on the record carrier. A signal block of information of the trick play video signal is recorded in n subsequent tracks ($T_2$) on the record carrier, where n is a constant integer for which holds $n \geq 1$, and the directly succeeding signal block of information of the data reduced digital video signal is recorded in m subsequent tracks ($T_3$ to $T_{25}$) directly following the n tracks, where m is an integer larger than 1. The apparatus is further adapted to record the signal block of information of the data reduced digital video signal in such a way in said m tracks that, viewed in the reproduction direction of the tracks on the record carrier, the first frame (I-frame) contained in said signal block is recorded first in the m tracks following the n tracks comprising the trick play video signal and the at least one second frame (B- or P frame) in the signal block is recorded thereafter in the m tracks. m may be variable for subsequent signal blocks of information of the data reduced digital video signal to be recorded on the record carrier. Further, the signal block of information of the data reduced digital video signal recorded in the m subsequent tracks of a group of n+m tracks includes complete frames of information of the data reduced digital video signal. The apparatus is further adapted to carry out an edit mode of operation, where the n trick play tracks ($T_2$) are used as edit gaps.

10 Claims, 3 Drawing Sheets

RECORDING OF A DATA REDUCED DIGITAL VIDEO SIGNAL IN SLANT TRACKS ON A RECORD CARRIER

BACKGROUND OF THE INVENTION

1. Field of the Invention

The invention relates to an apparatus of th helical scan type, for recording a data reduced digital video signal in slant tracks on a longitudinal record carrier, the data reduced digital video signal comprising first frames having data reduced video information obtained from video information of a picture that has been subjected to an intra-picture encoding step, and comprising second frames having data reduced video information obtained from video information of a picture that has been reduced in an inter-picture encoding step, the apparatus further being adapted to record a digital trick play video signal in said slant tracks on said record carrier, the apparatus comprising first input means for receiving the data reduced digital video signal, second input means for receiving the digital trick play video signal, and writing means for writing the data reduced digital video signal and the trick play video signal into the record carrier so as to obtain said slant tracks on the record carrier and to a method for recording the data reduced digital video signal.

2. Description of the Related Art

The apparatus in accordance with the opening paragraph is known from U.S. Pat. No. 4,807,053, Reference (1) in the List of References that can be found at the end of this application. The known method and recording arrangement provide a recording of a data reduced digital video signal such that reproduction in a feature or trick mode is possible. Feature or trick modes are those reproduction modes in which the transport speed of the longitudinal record carrier is other than nominal, where the nominal transport speed is the speed at which the data reduced digital video signal was originally recorded. Non-nominal transport speeds are transport speeds higher or lower than the nominal transport speed.

SUMMARY OF THE INVENTION

The invention aims at recording a data reduced digital video signal using a recording apparatus of the helical scan type. Further, the invention aims at providing the recording of a data reduced digital video signal such that reproduction in a feature mode is possible, more specifically, that reproduction during a feature mode with a record carrier speed higher than the nominal speed is possible. Further, the invention aims at providing additional measures such that editing becomes more reliable. This may effectively lead to the possibility of recording the tracks closer to each other, resulting in a higher density and thus larger storage capacity.

In accordance with the invention, the apparatus as defined in the opening paragraph is characterized in that the apparatus is adapted to generate signal blocks of information of the trick play video signal and to generate signal blocks of information of the data reduced digital video signal, a signal block of information of the data reduced digital video signal comprising a first frame and at least one second frame of the data reduced digital video signal, the apparatus further being adapted to record, each time, after each other a signal block of information of the digital trick play video signal and a signal block of information of the data reduced digital video signal, a signal block of information of the trick play video signal being recorded in n subsequent tracks on the record carrier, where n is a constant integer for which holds n≧1, and the directly succeeding signal block of information of the data reduced digital video signal being recorded in m subsequent tracks directly following the n tracks, where m is an integer larger than 1, the apparatus being adapted to record the signal block of information of the data reduced digital video signal in such a way in said m tracks that, viewed in the reproduction direction of the tracks on the record carrier, the first frame comprised in said signal block is recorded first in the m tracks following the n tracks comprising the trick play video signal and the at least one second frame in said signal block is recorded thereafter in said m tracks and that m may be variable for subsequent signal blocks of information of the data reduced digital video signal to be recorded on the record carrier.

The invention is based on the following recognition. In prior art recording systems, various solutions are given for recording trick play data onto a record carrier in order to enable a trick play reproduction. Reference is made in this respect to WO 95/28061, corresponding to U.S. Pat. No. 5,751,889, Reference (2) in the List of References. The solutions are sometimes hard to implement and sometimes only specific trick play velocities are possible.

In accordance with the invention, each of the n tracks in which a signal block of information of the trick play signal is recorded, comprises the trick play information over the total length of the track portions in the n tracks in which video data is to be stored. This means that for each trick play velocity each of those tracks is scanned and subsequently trick play data can be read from each of those tracks.

The solution now adopted further enables a more reliable editing, in that an apparatus capable of carrying out an editing step, may be characterized in that the apparatus is adapted to establish a group of m subsequent tracks recorded in the earlier recording step and lying between tracks comprising the trick play video signal, the apparatus further being adapted to start editing by generating a signal block of information of the data reduced digital video signal and recording said signal block of information substantially in said group of m tracks. This apparatus uses the trick play track as an edit gap. Editing is started by recording a signal block more or less exactly onto a signal block recorded earlier. The location of the m tracks, viewed in the longitudinal direction of the record carrier, when recording a signal block of information may be slightly shifted compared to the location of the m tracks in which a signal block of information was recorded earlier. The newly recorded group of m tracks may be shifted such that a track comprising the trick play information is slightly overwritten, resulting in a reproduced trick play signal of lower quality. This is, however, not a real problem, as the quality of the trick play information upon reproduction is generally of lesser importance for a viewer, so that, a reproduced trick play signal of a somewhat lower quality may not even be noticed by the viewer.

The data reduced digital video signal may be a video signal of the MPEG type, and the first frames in the data reduced digital video signal comprising intra picture encoded video information of the I type.

The draft Grand Alliance HDTV System Specification dated Feb. 22, 1994, reference (3) in the List of References, more specifically the chapter III of this specification, describes a video compression system for obtaining a data reduced video signal of the MPEG type. The data reduced video signal so obtained comprises a sequence of I-, P- and B-frames. The I-frames each comprise data reduced video information corresponding to a picture that has been encoded in an intra-picture encoding step. The P-frames each comprise data reduced video information corresponding to a picture that has been encoded in a predictive (or: uni-directional) inter-picture encoding step. The B-frames each comprise data reduced video information corresponding to a picture that has been encoded in a bidirectional inter-picture encoding step.

BRIEF DESCRIPTION OF THE DRAWINGS

These an other aspects of the invention will be apparent from and elucidated further with reference to the embodiments described in the following figure description, in which.

DESCRIPTION OF THE PREFERRED EMBODIMENTS

Figure 1:
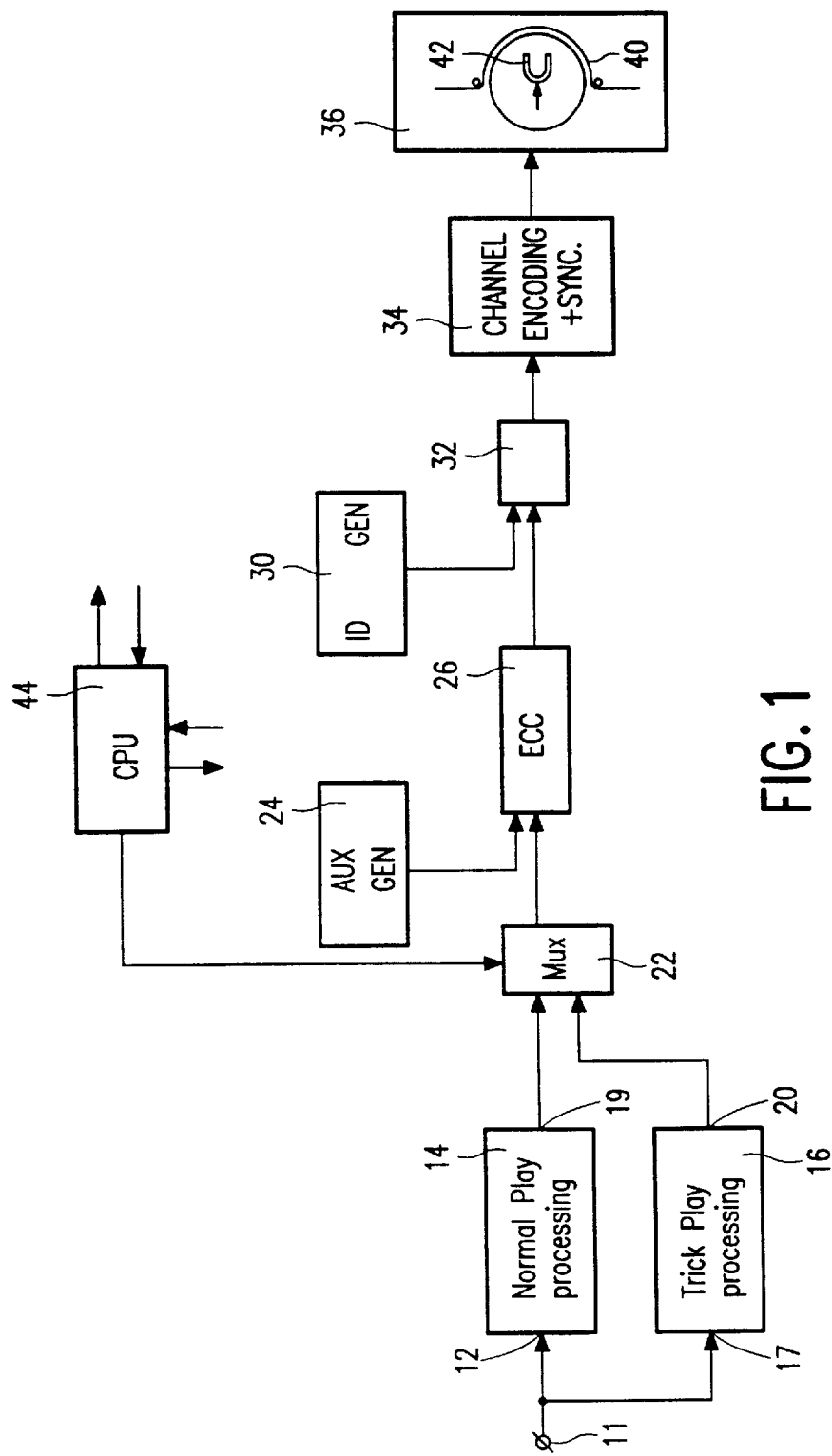
FIG. 1 shows an embodiment of the recording apparatus.

FIG. 1 shows schematically, an embodiment of the recording apparatus in accordance with the invention. The recording apparatus comprises an input terminal 11 for receiving a digital video signal, that may be in MPEG encoded form, for recording in the tracks. The input terminal 11 is coupled to an input 12 of a 'normal play' processing unit 14. Further, a 'trick play' processing unit 16 is provided having an input 17 also coupled to the input terminal 11. Outputs 19 and 20 of the 'normal play' processing unit 14 and the 'trick play' processing unit 16 are coupled to corresponding inputs of a multiplexer 22.

An auxiliary signal generator 24 is present for supplying auxiliary signal information for storage in the tracks. Outputs of the multiplexer 22 and the generator 24 are coupled to corresponding inputs of an error correction encoder unit 26. The error correction encoder unit 26 is capable of carrying out an error correction encoding step, denoted ECC.

The recording apparatus further comprises a generator 30 for adding ID information and for adding subcode information. After combination of the signals in the combining unit 32, the combined signal is applied to a unit 34, in which a channel encoding is carried out and where sync information is added.

The channel encoding carried out in the encoding unit 34 is well known in the art. Reference is made in this respect to U.S. Pat. No. 5,142,421, Reference (4) in the List of References, which discloses one possible embodiment of such channel encoding. This document also shows a way of adding the sync information to the datastream.

An output of the encoding unit 34 is coupled to an input of a writing unit 36, in which the datastream obtained with the encoding unit 34 is recorded in the slant tracks on the record carrier, by means of at least two write heads.

The error correction encoding step, denoted ECC, is needed so as to enable an error detection and correction in a subsequent reproduction step, not further described. A central processing unit 44 is available for controlling the various signal processing steps in the units. This has been made clear in FIG. 1 by the arrows going out from and going into the unit 44. The processing unit 44, among others, controls the multiplexer unit 22, in order to multiplex the trick play data and the data reduced digital video signal such that signal blocks of trick play data and blocks of information of the data reduced digital video signal are generated for recording after each other in the tracks.

No further description of the 'normal play' processing unit 14 will be given, as such description is not relevant for the explanation of the present invention. It should however be noted that international Patent Application WO 95/27, 978, corresponding to U.S. Pat. No. 5,579,183, Reference. (5) in the List of References, gives an extensive description of the recording arrangement as far as the 'normal play' processing during recording of an MPEG information signal is concerned. This application is therefore, where necessary, incorporated herein by reference.

Trick play information can be obtained from the original datastream supplied via the input terminal 11. The trick play information is also a data reduced digital video signal. More specifically, the trick play information can be obtained from a DCT encoding of original pictures or can be obtained from an MPEG intra encoding on the video signal. In the latter case, self contained blocks of information, called 'slices' in MPEG, are recorded in the tracks, so that upon reproduction in the trick play mode, they can be decoded independently of each other by a standard MPEG decoder, that may also be used for decoding the normal play video data reproduced in the normal play reproduction mode.

Figure 2:
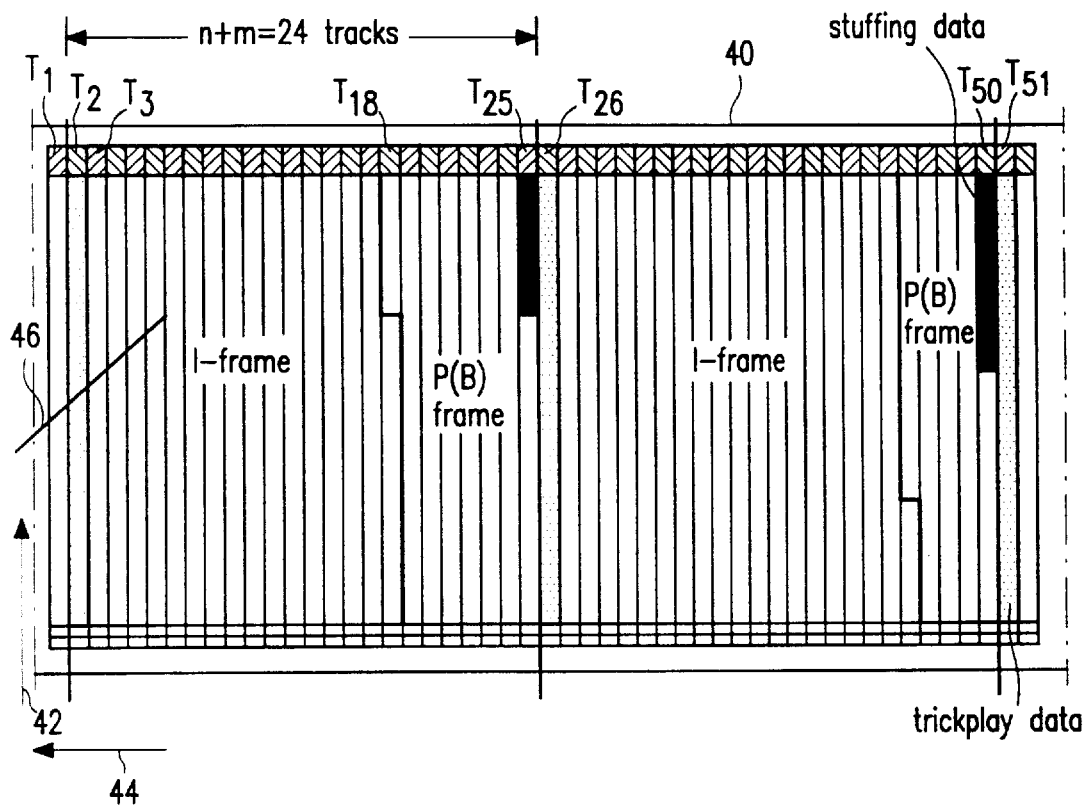
FIG. 2 shows the record carrier obtained with the recording apparatus.

FIG. 2 shows an embodiment of the record carrier 40 on which slant tracks $T_1$, $T_2$, $T_3$, etc., comprising the video information have been recorded by the apparatus of FIG. 1. For clarity reasons, FIG. 2 shows the tracks lying in a direction tangential to the longitudinal direction of the record carrier 40. In reality, however, the angle between the longitudinal direction of the record carrier and the length direction of the tracks is much smaller than 90°. The arrow 42 shows the direction of travel of a writing head across the record carrier 40. The arrow 44 shows the direction of movement of the record carrier 40. As a consequence, the tracks $T_1$, $T_2$, $T_3$, . . . , are recorded on the record carrier 40 in this order.

Figure 3:
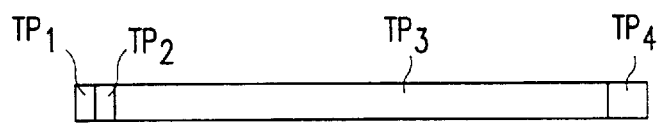
FIG. 3 shows an example of the tracks as recorded on the record carrier.

FIG. 3 shows the contents of a track. The track is divided into a number of track parts, in the present example, the track parts $TP_1$ to $TP_4$. Track part $TP_1$ can be considered to be a part comprising clock run-in words, well known in the art, for realizing a locking in on the bit-rate of the data stored in the track. Track part $TP_2$ can be an ITI area, well known in the art, or an area in which auxiliary data can be stored. The track part $TP_3$ is the portion of the track in which the video data is stored. The track part $TP_4$ is used for storing compressed audio information.

The apparatus of FIG. 1 is capable of generating signal blocks of information for recording in a group of, each time, n+m subsequent tracks. In the present example, the group of tracks is 24 tracks large, but could have any other number, such as 20. Trick play information, generated by the trick play processing unit 16, is recorded in the track parts $TP_3$ of the first n tracks in the group of n+m tracks. In the present example, n=1. The data reduced video information generated by the normal play processing unit 14 is recorded in the track parts $TP_3$ of the remaining m tracks of each group of n+m tracks. More specifically, video information corresponding to an I-frame is recorded first in the remaining m tracks of each group, followed by video information corresponding to a P- or a B-frame. Video information corresponding to subsequent P- or B-frames may be recorded thereafter in the group of n+m tracks. Complete frames, at least one I-frame and one or more B- or P-frames, are stored in each group of n+m tracks. If, the final track(s) in a group of n+m tracks is (are) not completely filled with real video data, this track (those tracks) are filled by means of stuffing data.

More specifically, trick play data is recorded in the track parts $TP_3$ of the tracks $T_2$, $T_{26}$ and $T_{51}$ in FIG. 2. Further, the data reduced video information corresponding to an I-frame is recorded in the track parts $TP_3$ of the tracks $T_3$ to (and inclusive the first portion of the track) $T_{18}$. Next, data reduced video information corresponding to a P- or a B-frame is recorded in the track parts $TP_3$ of the tracks $T_{18}$ (remaining portion) to track $T_{25}$ (first portion). The remaining portion of the track $T_{25}$ is filled with stuffing data, indicated by full black.

Figure 4:
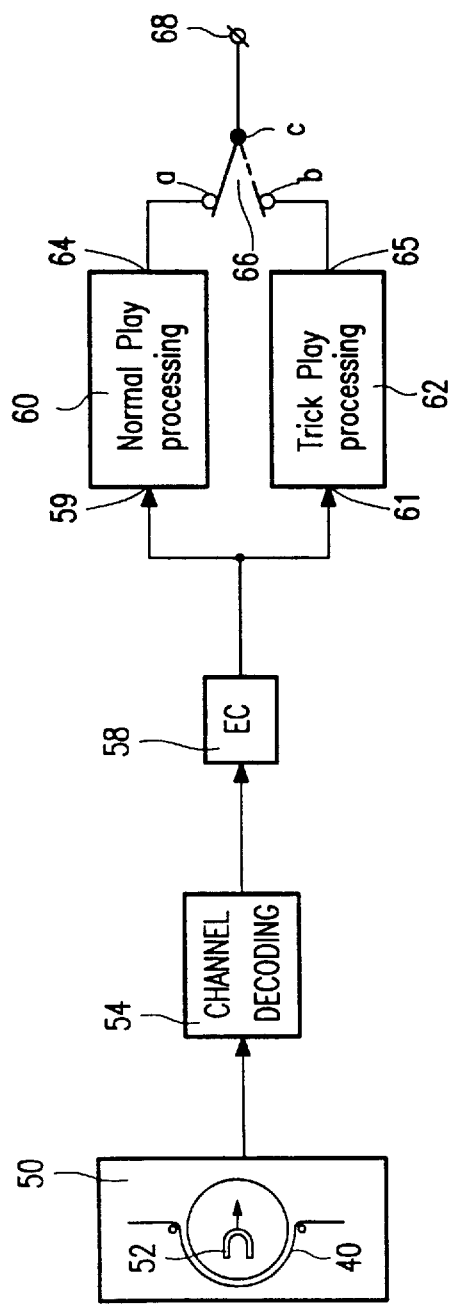
FIG. 4 shows a reproducing apparatus.

FIG. 4 shows schematically, an embodiment of a reproduction apparatus for reproducing information from the record carrier 40 obtained with the recording apparatus of FIG. 1. The reproduction apparatus comprises a reading unit 50, having at least two reading heads, for reading information from the slant tracks on the record carrier 40. An output of the reading unit 50 is coupled to an input of a decoding unit 54, which carries out a channel decoding on the signal read out, well known in the art. Next, an error correction is carried out in the error correction unit 58.

The output terminal of the error correction unit 58 is coupled to an input of a 'normal play' processing unit 60. Further, a 'trick play' processing unit 62 is provided having an input also coupled to the output of the error correction unit 58. Outputs 64 and 65 of the 'normal play' processing unit 60 and the 'trick play' processing unit 62 are coupled to corresponding terminals a and b respectively, of a switch 66, a c-terminal of which is coupled to an output terminal 68. If the reproducing apparatus is switched into a 'normal play' reproduction mode, this means that the record carrier is transported at a nominal speed, that the 'normal play' processing unit 60 is enabled and the switch 66 is switched into the position a-c. If the reproducing apparatus is switched into a 'trick play' reproduction mode, also called 'feature mode', this means that the record carrier is transported at a speed other than the nominal speed, that the 'trick play' processing unit 62 is enabled and the switch 66 is switched into the position b-c.

Well known in the prior art is that the trick play data recorded in the tracks $T_2$, $T_{26}$, . . . includes identifier information identifying the data as trick play data. During reproduction, the reproducing apparatus is capable of detecting the identifier data, so that it can establish the location of the groups of n+m tracks. During normal play reproduction, the reproducing apparatus is thus capable of retrieving the data reduced digital video information recorded in the track parts $TP_3$ of the remaining m tracks of each group of n+m tracks.

During trick play reproduction, the reproducing apparatus scans the tracks along a line given by the line 46 in FIG. 2. Portions of the data stored in the tracks $T_2$, $T_{26}$, $T_{51}$, . . . can thus be retrieved and converted into a trick play image sequence by the trick play processing unit 62. To that purpose, the trick play processing unit 62 comprises a picture memory (not shown). Each time, when a portion of valid trick play data has been retrieved, part of the contents of the memory is updated with this portion of trick data. Retrieval of picture information from said memory for displaying on a TV screen is reaized with a rate corresponding to the display rate.

In an edit mode of operation, the apparatus of FIG. 1 is capable of recording video information onto the record carrier 40 on which video information had been recorded in an earlier recording step. The apparatus uses one of the trick play tracks as an edit gap. The apparatus is therefore capable of switching itself into a reproduction mode so as to establish the location of one of the trick play tracks. Upon detecting one of the trick play tracks, such as the track $T_2$, it switches itself into a subsequent recording mode in which video data is recorded onto the record carrier 40. A signal block of information of the data reduced digital video signal is generated for recording in the m tracks ($T_3$ to $T_{25}$) following the trick play data track $T_2$. Recording can be continued in the way as described above with reference to FIG. 1, that is: after having generated the first signal block of information of the data reduced digital video signal, a signal block of information of trick play data is formed for recording in the track $T_{26}$, followed by the recording of a subsequent signal block of information of the data reduced digital video signal in the tracks $T_{27}$ to $T_{50}$, and so on. This edit mode of operation could be specified further as being an append mode of operation, in the sense that the edit step results in a new recording to be realized over the final portion of the earlier recording, where the position of the termination point of the new recording on the record carrier is located beyond the position of the termination point of the earlier recording. Preferably, a signal block of information of the trick play signal is generated as the last signal block of information to be recorded and subsequently recorded on the record carrier.

In an insert mode of operation, only an intermediate portion of the original recording is overwritten by a new recording. The start of recording in the insert mode of operation is the same as explained above. In this case, preferably, a signal block of information of the data reduced digital video signal is generated as the last signal block to be recorded. Now, the track of the original recording and comprising trick play information, which track directly follows the last signal block of information of the data reduced digital video signal recorded in the append mode of operation, can serve as an edit gap at the end of the new recording.

The present invention thus relates to recording of a data reduced digital video signal and a trick play video signal on a longitudinal record carrier. More specifically, a signal block of information of the trick play signal is generated and recorded in n tracks, where n is a constant integer for which holds $n \geq 1$. A signal block of information of the data reduced digital video signal is generated and recorded in m tracks directly following the n tracks in which the signal block of information of the trick play signal is recorded. m is an integer larger than 1. m may be different for subsequent signal blocks of information of the data reduced digital video signal recorded on the record carrier. Preferably, however, m is constant. Editing of the data reduced digital video signal is also possible, where the n tracks of information of the trick play signal serve as an edit gap.

While the present invention has been described with respect to preferred embodiments thereof, it is to be understood that these are not limitative examples. Thus, various modifications may become apparent to those skilled in the art, without departing from the scope of the invention, as defined by the claims. The value for n may thus be different from 1, such as 2, or more. Generally, the value of n will be at least one order of magnitude smaller than the value for m. As another example, the embodiments disclosed show signal blocks of information of the data reduced digital video signal comprising video information of only one I-frame and only one P- or B-frame. More frames may be included in the signal block, such as a GOP (group of pictures, a well known conception in MPEG).

Further, the invention lies in each and every novel feature or combination of features as herein disclosed.

LIST OF REFERENCES (1) U.S. Pat. No. 4,807,053 (PHN 11.768)
(2) WO 95/28061 corresponding to U.S. Pat. No. 5,751,889 (PHN 14.832)
(3) Grand Alliance HDTV System Specification, draft document. Submitted to the ACATS Technical Subgroup, Feb. 22, 1994. Chapter III Video compression system.
(4) U.S. Pat. No. 5,142,421 (PHN 13.537)
(5) WO 95/27,978, corresponding to U.S. Pat. No. 5,579,183 (PHN 14.818).

We claim:

1. An apparatus of the helical scan type, for recording a data reduced digital video signal in slant tracks on a longitudinal record carrier, the data reduced digital video signal comprising first frames having data reduced video information obtained from video information of a picture that has been subjected to an intra-picture encoding step, and second frames having data reduced video information obtained from video information of a picture that has been reduced in an inter-picture encoding step, the apparatus further recording a digital trick play video signal in said slant tracks on said record carrier, the apparatus comprising:

first input means for receiving the data reduced digital video signal;
second input means for receiving the digital trick play video signal; and
writing means for writing the data reduced digital video signal and the digital trick play video signal onto the record carrier to form said slant tracks on the record carrier, characterized in that the apparatus further comprises:
first means for forming signal blocks of information of the digital trick play video signals;
second means for forming signal blocks of information of the data reduced digital video signal, a signal block of information of the data reduced digital video signal comprising a first frame and at least one second frame of the data reduced digital video signal; and
means coupled to said first and second forming means for controlling said first and second forming means to apply, each time, a signal block of information of the digital trick play video signal directly succeeded by a signal block of information of the data reduced digital video signal to said writing means so that said writing means writes the signal block of information of the digital trick play video signal in n subsequent tracks on the record carrier, where n is a constant integer for which holds n≧1, and then writes the directly succeeding signal block of information of the data reduced digital video signal in m subsequent tracks directly following the n tracks, where m is an integer larger than 1, the apparatus recording the signal block of information of the data reduced digital video signal in such a way in said m tracks that, viewed in the reproduction direction of the tracks on the record carrier, the first frame contained in said signal block is recorded first in the m tracks following the n tracks containing the trick play video signal and the at least one second frame in said signal block is recorded thereafter in said m tracks, and that m may be variable for subsequent signal blocks of information of the data reduced digital video signal to be recorded on the record carrier.

2. The apparatus as claimed in claim 1, characterized in that the signal block of information of the data reduced digital video signal recorded in the m subsequent tracks of a group of n+m tracks comprises complete frames of information of the data reduced digital video signal.

3. The apparatus as claimed in claim 1, characterized in that the data reduced digital video signal is a digital video signal of the MPEG type, the first frames in the data reduced digital video signal comprising intra-picture encoded video information of the I type.

4. The apparatus as claimed in claim 3, characterized in that the at least one second frame in the data reduced digital video signal comprises inter-picture encoded video information of the P or B type.

5. The apparatus as claimed in claim 4, characterized in that a signal block of information recorded in said m subsequent tracks comprises data reduced video information corresponding to a group of pictures (GOP).

6. The apparatus as claimed in claim 1, wherein, in an edit mode of operation, the apparatus is adapted to record a data reduced digital video signal on the record carrier in tracks recorded in an earlier recording step, characterized in that the controlling means establishes a group of m subsequent tracks on said record carrier recorded in in earlier recording step and lying between tracks comprising the trick play video signal, the controlling means starting said edit mode by causing said second forming means to apply a signal block of information of the data reduced digital video signal to said writing means so that said writing means writes said signal block of information substantially in said established group of m subsequent tracks.

7. The apparatus as claimed in claim 1, characterized in that n equals 1.

8. The apparatus as claimed in claim 7, characterized in that m is a constant integer larger than 1.

9. The apparatus as claimed in claim 8, characterized in that m equals 24.

10. A method of recording a data reduced digital video signal in slant tracks on a longitudinal record carrier, the data reduced digital video signal comprising first frames having data reduced video information obtained from video information of a picture that has been subjected to an intra-picture encoding step, and second frames having data reduced video information obtained from video information of a picture that has been reduced in an inter-picture encoding step, the method further comprising recording a digital trick play video signal in said slant tracks on said record carrier, the method comprising the steps;

receiving the data reduced digital video signal;
receiving the digital trick play video signal; and
writing the data reduced digital video signal and the digital trick play video signal onto the record carrier to form said slant tracks on the record carrier, characterized in that the method further comprises the steps;
generating signal blocks of information of the digital trick play signal;
generating signal blocks of information of the data reduced digital video signal, a signal block of information of the data reduced digital video signal comprising a first frame and at least one second frame of the data reduced digital video signal;

recording, each time, a signal block of information of the digital trick play video signal directly succeeded by a signal block of information of the data reduced digital video signal on the record carrier, wherein said signal block of information of the digital trick play video signal is recorded in n subsequent tracks on the record carrier, where n is a constant integer for which holds that n≧1, and the directly succeeding signal block of information of the data reduced digital video signal is recorded in m subsequent tracks directly following the n tracks, where m is an integer larger than 1, wherein the signal block of information of the data reduced digital video signal is recorded in such a way in said m subsequent tracks that, viewed in the reproduction direction of the tracks on the record carrier, the first frame contained in said signal block is recorded first in the m tracks following the n tracks containing the digital trick play video signal and the at least one second frame in said signal block is recorded thereafter in said m tracks, and wherein m may be variable for subsequent signal blocks of information of the data reduced digital video signal to be recorded on the record carrier.

* * * * *